United States Patent [19]
Lipe

[11] Patent Number: 5,692,189
[45] Date of Patent: Nov. 25, 1997

[54] METHOD AND APPARATUS FOR ISOLATING CIRCUIT BOARDS IN A COMPUTER SYSTEM

[75] Inventor: Ralph A. Lipe, Woodinville, Wash.

[73] Assignee: Microsoft Corporation, Redmond, Wash.

[21] Appl. No.: 270,670

[22] Filed: Jul. 5, 1994

[51] Int. Cl.⁶ .............................. G06F 12/00; G06F 13/00
[52] U.S. Cl. ........................ 395/651; 395/653; 395/403
[58] Field of Search ........................ 395/700, 280–280.3, 395/285–285.3, 829, 401, 403, 830, 651–653; 364/280, 280.2, 280.3, 285, 285.3

[56] References Cited

U.S. PATENT DOCUMENTS

| | | | |
|---|---|---|---|
| 4,465,904 | 8/1984 | Gottsegen et al. | 179/5 R |
| 4,996,688 | 2/1991 | Byers et al. | 371/16.5 |
| 5,012,514 | 4/1991 | Renton | 380/4 |
| 5,109,332 | 4/1992 | Culley . | |
| 5,144,551 | 9/1992 | Cepulis . | |
| 5,161,102 | 11/1992 | Griffen et al. | 395/800 |
| 5,165,037 | 11/1992 | Culley . | |
| 5,168,562 | 12/1992 | Estepp et al. | 395/500 |
| 5,218,686 | 6/1993 | Thayer . | |
| 5,226,122 | 7/1993 | Thayer et al. . | |
| 5,257,387 | 10/1993 | Richek et al. | 395/800 |
| 5,263,148 | 11/1993 | Jones, Jr. et al. | 395/500 |
| 5,278,803 | 1/1994 | Wanner . | |
| 5,452,454 | 9/1995 | Basu | 395/700 |
| 5,530,895 | 6/1996 | Enstrom | 395/829 |

Primary Examiner—Alvin E. Oberley
Assistant Examiner—Alice Y. Park
Attorney, Agent, or Firm—Jones & Askew, LLP

[57] ABSTRACT

A method of individually isolating a circuit board that has been added to an expansion slot of a computer system. If a conflict exists between the circuit board and other resources of the computer system, the present invention isolates the memory resource requirements of the circuit board from the computer system. The memory resources requirements of the circuit board may be isolated from the computer system by disabling access to the memory of the computer system which is generally designated for circuit board use. Access to this memory may be disabled by disabling an address line of the expansion slot in which the circuit board has been added. In a computer system utilizing an industry standard bus system the present invention disables address A19 of the expansion slot. A latch is typically coupled to the address line corresponding to the memory range generally designated for circuit board use for selectively disabling the address line so that memory resources requirements of the circuit board is isolated from the computer system. The present invention also may isolate the input and output resource requirements of the circuit board from the computer system while the memory resources are isolated. The input and output resource requirements of the circuit board may be isolated by selecting a control line that prevents the circuit board from communicating with input and output lines of computer system.

9 Claims, 6 Drawing Sheets

METHOD AND APPARATUS FOR ISOLATING CIRCUIT BOARDS IN A COMPUTER SYSTEM

TECHNICAL FIELD

The present invention relates generally to resolving conflicts between computer system resources and in particular, resolving resource conflicts due to circuit boards added to a computer system.

BACKGROUND OF THE INVENTION

Microcomputers may be designed as single board computers or as general purpose computers having a modular design. Computers with a modular design provide a degree of flexibility that is not found in single board computers. With a modularly designed computer, a designer or user may add or remove various modules from the microprocessor system. Many general purpose computers provide expansion slots which accept various types of circuit boards. General purpose computers with expansion slots enable a user to customize a computer system in a modular fashion. Currently, manufacturers provide a wide range of circuit boards which may be integrated into a general computer system to satisfy the desired specification of the user. For example, disk controllers, expanded memory boards, and video display adapters are widely available to enable users to customize their computer systems.

When a circuit board is added to a computer system through the expansion slots, the card is electrically connected with the computer system via a bus. Generally, a bus is divided into sets of electrical connections, for example, the address bus, the data bus, and the control bus. The address bus is used to specify the location of a peripheral device or stored data. The data bus is bi-directional and is used to transfer data between the microprocessor system, memory, circuit boards or peripherals. Various signals for controlling the operation of the bus are transmitted along the control bus. Also, input/output ports are located along the bus to provide connections to devices external to the basic microprocessor system. The transfer of information to and from input/output ports is accomplished by the cooperation of the control, address, and data buses.

Circuit boards connected to the bus of the computer system typically share the resources of the computer. Computer system resources may include, for example, a central processing unit, memory, various buses, input/output ports, expansion slots for receiving circuit boards, circuit boards and control circuits. Because circuit boards are made by different manufacturers and accomplish different functions, the default assignment of the circuit boards to the computer system resources may conflict. For example, input/output port assignments may conflict or memory assignments may conflict.

When computers are turned on, computer programs located within read only memory (ROM) are executed. These programs are generally termed start-up programs. The start-up programs determine whether computer resources are operable or conflict and also initialize or prepare the computer for operation with application programs and peripherals. When a new circuit board is added to a computer system, the start-up programs similarly prepare and initialize the circuit board for use in the computer system.

If an input/output conflict exists in the system, an unexpected error will generally occur during the operation of the system. When memory conflicts are encountered during the computer start-up process, a check sum error results and the system may not boot. A memory conflict will prevent the computer from operating properly.

Several U.S. patents address the problem of configuring computer systems with circuit boards, for example, U.S. Pat. No. 5,263,148 to Jones, Jr. et al. and U.S. Pat. No. 5,257,387 to Richek et al. The Jones, Jr. et al. patent relates to a method and apparatus for determining and selecting configuration options and settings of circuit boards in a computer system. The user is provided with a choice to configure the system with all boards enabled. The options and settings of a board are placed in a file according to the specified format and the system determines if a non-conflicting use of the common system resources is possible. If so, the option and setting parameters are used to configure the circuit boards.

The Richek et al. patent relates to a method and apparatus for dynamic and automatic configuration of a computer system and circuit boards, including computer resource allocation and conflict resolution. Based on information contained in a circuit board configuration file, the system attempts to allocate the common computer resources required by each circuit board based on the primary or default resource requirements set forth in each circuit board's configuration file. If a conflict exists, the system attempts to resolve conflicts by determining if the conflicting request may be assigned to an alternate resource. The system stores the resource allocation information as part of a system configuration file which may be then used when the system is rebooted.

The patents summarized above generally provide methods of determining whether a conflict of computer resources exists based on information contained in configuration files. If a conflict exists, non-conflicting alternatives are presented where possible. These patents however do not address or provide a method which allows a computer to boot when a memory error occurs as a result of installing add-in circuit boards that occupy conflicting memory space.

Thus, there is need for a method of selectively isolating add-in circuit boards for determining conflicts of computer resources and enabling a computer system to boot or operate despite initial memory conflicts resulting from add-in circuit boards.

SUMMARY OF THE INVENTION

Generally described, the present invention provides a method and apparatus for isolating circuit boards from the computer system. The present invention is capable of isolating the memory and input/output operations of a circuit board from the computer system to resolve conflicts in the computer system.

More particularly described, the present invention provides a method to isolate individual circuit boards during the computer start-up process in a manner which identifies a resource conflict, such as a memory conflict, and enables the computer to boot-up or operate despite the initial memory conflict. During start-up, a basic input/output system (BIOS) routine is utilized to integrate circuit boards into the system. The BIOS routine, which is stored in a memory unit, along with the central processing unit of the computer system examines each board during start-up to determine whether or not a resource conflict occurs. The computer system, the BIOS routine, and a controllable latch connected to each bus socket containing a circuit board are used to isolate a particular circuit board if a conflict occurs.

In accordance with the present invention, when a computer system is started-up, the expansion slots of the computer are examined to determine whether or not a circuit board has been added. If a circuit board has been added to an expansion slot, the start-up program determines the computer resources required by the circuit board for proper operation, such as the memory resources and the input/output resources.

If there is not a conflict between the default memory ranges (memory requirements) that the circuit board is assigned to utilize and the resources of the computer system, the circuit board is integrated into the computer system. If, however, a conflict exists, the present invention denies the conflicting circuit board access to the memory of the computer system. Access to this memory may be denied by disabling a particular address line of the expansion slot in which the circuit board has been added. In a computer system utilizing an Industry Standard Architecture (ISA) bus system, the present invention disables address A19 of the expansion slot. A latch is typically coupled to the particular address line to selectively disable access to the memory.

Additionally, the present invention may isolate the default input and output port assignments (input and output requirements) of the circuit board from the computer system. The input and output port assignments may be isolated by selecting a control line that prevents the circuit board from communicating with input and output ports of the computer system. Isolating the input and output requirements of the circuit board may be accomplished by selecting an address enable (AEN) line associated with the expansion slot holding the circuit board.

By disabling certain address lines and providing appropriate control signals, the present invention disables the expansion slot containing the new circuit board. The computer may then complete start-up procedures while this slot is disabled. A message is typically displayed to the user indicating the occurrence of a conflict between the newly added board and the computer resources. The present invention also can specifically identify the conflicting resources and provides a list of resources available within the computer system that may be used without conflict.

When a newly added circuit board is disabled, the user faces several options including: continue operating the computer without enabling the newly added circuit board; turning off the computer and reconfiguring the circuit board so that computer resources do not conflict; or disabling a circuit board other than the newly added board. If the user chooses to disable another circuit board, the computer system will reboot with the user's desired configuration.

Thus, it is an object of the present invention to determine whether a resource conflict exists in a computer system when a circuit board has been added to the computer system.

It is a further object of the present invention to provide a method for allowing computer start-up procedures to continue despite a circuit board memory conflict which causes an error during start-up procedures of the computer.

It is a further object of the present invention to isolate the memory resource requirements of a circuit board which has been added to a computer system.

It is a further object of the present invention to provide a mechanism for preventing a circuit board from accessing computer system memory for which a conflict may result.

It is a further object of the present invention to isolate the input and output requirements of a circuit board added to the computer system while the memory requirements have been isolated.

These and other objects, features, and advantages of the present invention will become apparent from reading the following description in conjunction with the accompanying drawings.

DETAILED DESCRIPTION

Figure 1:
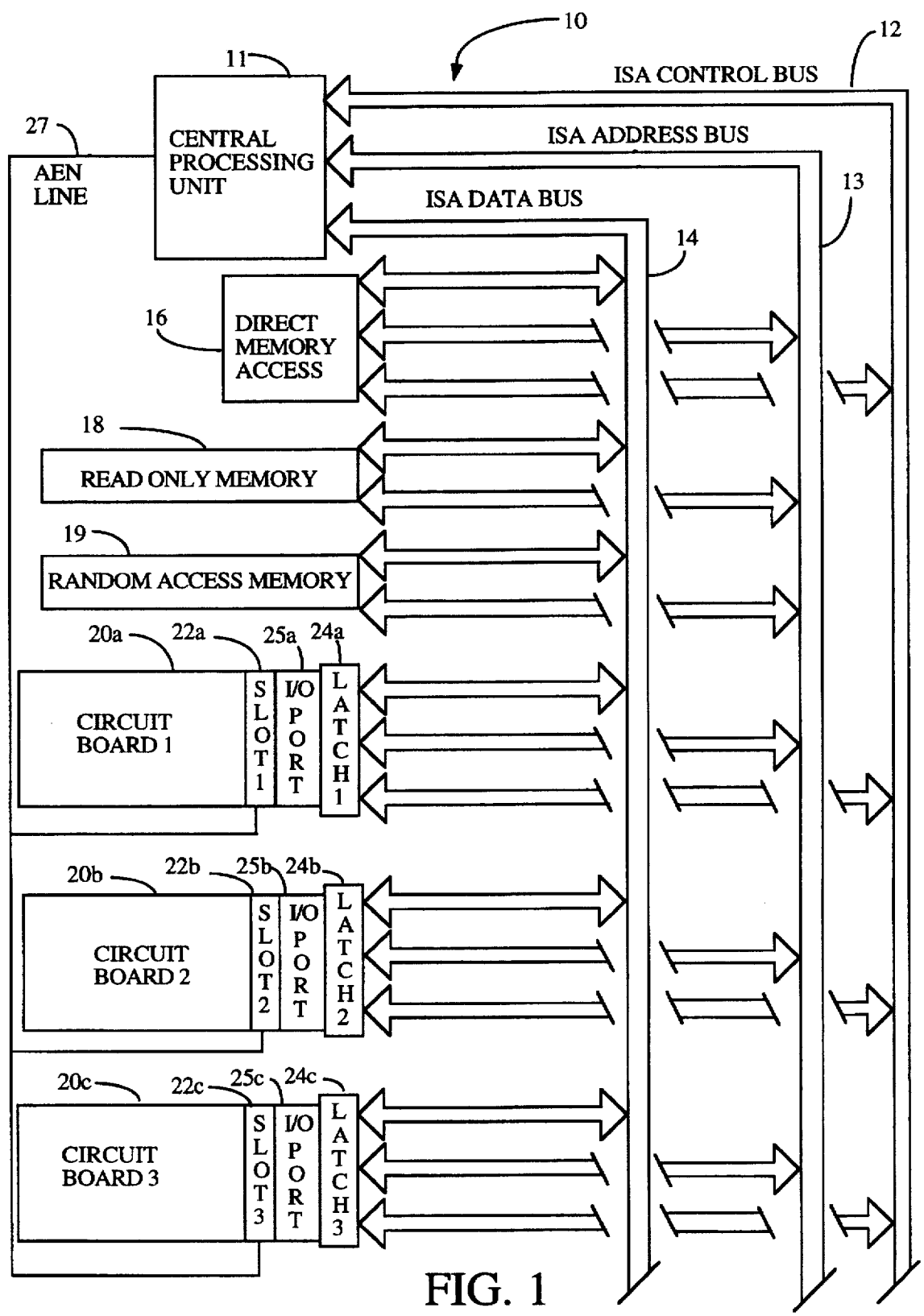
FIG. 1 is a block diagram of the preferred embodiment of the present invention in its preferred environment.

A computer system implemented according to the present invention may be based on an industry standard architecture as known to those skilled in the art. Computer systems communicate among the various devices forming the system via electrical connections known as a bus. Referring to FIG. 1, a computer system 10 constructed according to the present invention is shown. For the simplicity of the drawings, many components of a standard computer system have not been illustrated such as address buffers, memory buffers and other standard control circuits because these elements are well known and illustrated in the prior art and are not necessary for the understanding of the present invention. The computer system 10 is preferably compatible with the Industry Standard Architecture (ISA). Those skilled in the art should appreciate that other bus systems may be utilized with the present invention, such as the Extended Industry Standard Architecture (EISA) bus and the Micro Channel Architecture (MCA) bus.

A central processing unit 11, also referred to as a main processor, is interfaced with an ISA control bus 12, an ISA address bus 13, and an ISA data bus 14, which collectively form a computer bus. Each of the buses 12, 13, and 14 is interfaced with a direct memory access (DMA) unit 16. The DMA unit 16 controls data transfers between input/output devices and memory without utilizing the central processing unit 11. A read only memory (ROM) unit 18 and a random access memory (RAM) unit 19 are interfaced with the ISA address bus 13 and the ISA data bus 14. It should be appreciated by those skilled in the art that various types of RAM are used in a computer system, such as CMOS RAM, system RAM and shadow RAM. RAM unit 19 is illustrated to represent the various types of RAM known by those skilled in the art. It is known to those skilled in the art that ROM and RAM are interfaced and accessed differently within a computer system and such methods are well known. Located within the memory unit 18 are start-up programs, such as power-on self tests, BIOS programs, and input/output drivers, as well as other programs and information utilized in a general purpose computer system.

Circuit boards or adapter cards 20a–c are shown plugged into expansion slots or sockets 22a–c, respectively, of the computer system 10. The three expansion slots 22a–c, which are connected to the buses 12, 13, and 14, are representative of the expansion slots typically provided by an ISA-compatible computer. However, the invention is not limited to operation with only three expansion slots. Each of the circuit boards 20a–c is electrically connected to the buses 12, 13, and 14. As noted above, circuit boards are utilized to provide numerous customized features for computer systems. Integration of the circuit boards 20a–c into the computer system 10 is accomplished through start-up programs as discussed herein. Latches 24a–c, which are connected to expansion slots 22a–c, respectively, are interfaced with the computer bus through input/output ports 25a–c. The latches 24a–c are provided to aid in resolving conflicts in computer resources, as discussed in more detail below. An address enable (AEN) line 27 is connected to expansion slots 22a–c and generally controls input and output communications with circuit boards 20a–c and other peripheral devices of the computer system 10.

Throughout the description of the preferred embodiment, the reference numerals 20a, 22a, 24a and 25a will be generally cited for a circuit board, expansion slot, latch, and input/output port respectively, and the description accompanying the reference numerals 20a, 22a, 24a and 25a generally applies to the other circuit boards, expansion slots, latches and input/output ports illustrated in the drawings.

After an add-in circuit board, such as one of the circuit boards 20a–c, is plugged into one of the expansion slots, such as the expansion slots 22a22b or 22c, the connected circuit board must be integrated with the computer system resources to provide the functions available from the circuit board. As noted above, computer system resources may include, for example, a central processing unit, memory, various buses, input/output ports, expansion slots for receiving circuits boards, circuits boards and control circuits. The circuit board is preferably integrated into a computer system, such as the computer system 10, by ROM programs stored in memory. In general, additional ROM programs are also located on circuit boards to provide device level control for that circuit board.

Prior to reviewing the preferred system for resolving computer resource conflicts, it will be useful to review the operation of ROM-based start-up programs and basic input/output system (BIOS) programs. The ROM programs are used to perform several tasks that aid in the start-up of the computer system after power has been turned on or after the computer system has been re-booted. The ROM programs include start-up programs for preparing the computer to run other software applications. Generally, the start-up programs include the following operations: performing a reliability test of the computer and ROM programs; initializing equipment attached to the computer; setting up interrupt vector tables; and determining if other equipment has been added to the computer system.

The ROM start-up programs include power-on self test (POST) programs and BIOS programs. The POST programs perform a sequence of routines on the computer system components, including memory, to insure that the computer system will operate properly. BIOS programs provide device level control or support services for the major input/output devices in the computer system.

POST helps insure that the computer system will operate properly by first testing, then initializing basic components of the computer system including: the hardware devices on the computer system board; the system configuration data; and hardware devices located on add-in circuit boards. For example, as known to those skilled in the art, some of the components tested by POST include: the microprocessor, RAM, ROM BIOS routines, chip sets of the system, configuration data, the keyboard, the mouse and option or additional ROMS from circuit boards. POST returns the current list of equipment attached to the computer system and the amount of memory available.

During POST, default interrupt vectors are set up for BIOS. Following interrupt vector set up, the add-in circuit boards are scanned for additional ROM modules. The initialization routines may pass control to a ROM routine on the circuit boards. The ROM routine on the circuit board sets-up or utilizes appropriate interrupt vectors to integrate the circuit board into the computer system. During POST, absolute addresses are scanned for a valid circuit board ROM. As well known to those skilled in the art, a check sum process is performed to determine the integrity of the ROM module. If the sum is zero then the module is considered valid. If the POST process identifies a valid ROM, the circuit board may perform its necessary initialization task and return control to the BIOS routines. However, if the sum is not zero then the module is considered invalid.

In scanning for additional ROM modules, various locating techniques may be used. To gain full advantage of the entire address space of a central processor, sometimes RAM, normally located in the main memory block of the address space, is mapped to the area of memory generally utilized by circuit boards, the adapter region. However, a memory error will occur if the additional ROM modules of the circuit board are initially configured to occupy the same address space as the computer system RAM. Conventionally, identifying each memory location of each memory unit of the adapter region of the central processor's address space is accomplished by searching for a predetermined data word, referred to as a signature. However, the address region of the central processor's address space is often occupied by read only memory devices that have no signature. This prevents conventional central processors from locating these devices and, therefore, may result in a resource conflict. Accordingly, in addition to conventional memory locating methods, it is preferable to provide a method for identifying occupied memory units of a central processor's address space, without relying upon the presence of a predetermined data word, or signature, in the occupied memory units. Such a method is provided in U.S. patent application Ser. No. 07/844,239 filed Mar. 2, 1992 which is herein incorporated by reference and assigned to Microsoft Corporation, the assignee of the present case.

The method of U.S. patent application Ser. No. 07/844,239 relies upon the observation that unoccupied memory space will not always place the same data on the computer system bus and upon the observation that unoccupied memory space typically places very similar noise signals on the computer system bus. Therefore, the method of U.S. patent application Ser. No. 07/844,239 attempts to determine, first, whether the same data can be read out of each address location of memory unit during successive reads and, second, whether the data contained in the address locations of the memory unit is the same for each address location or, whether a minimum number of distinct data bytes are stored in the address locations of the memory unit. After conventional methods have been utilized for identifying random access memory, read only memory devices, and other occupied address space, each memory unit of the address space that has not been identified as being occupied is examined by the method identified in U.S. patent application Ser. No. 07/844,239. The location of these occupied memory spaces are used to analyze address space for conflicts.

The end result of determining the location and address space occupied by various computer system components is a set of resource requirements which is stored in random access memory. From the resource requirements of the devices of the computer system, resource conflicts may be determined and processed according to the subject matter discussed herein.

As noted above, when memory conflicts are encountered when the computer system is starting up, a check sum error results and the system generally will not boot. This prevents the user from utilizing the computer with the conflicting circuit boards. However, if the computer system does boot, the system would be unreliable and errors during operation may later manifest.

After the computer system successfully boots, the BIOS program accepts requests from application programs within the computer system and performs input/output services requested by the programs in addition to providing commands to hardware devices attached as part of the computer system. It will be appreciated that BIOS programs are generally invoked through software interrupts.

Figure 2:
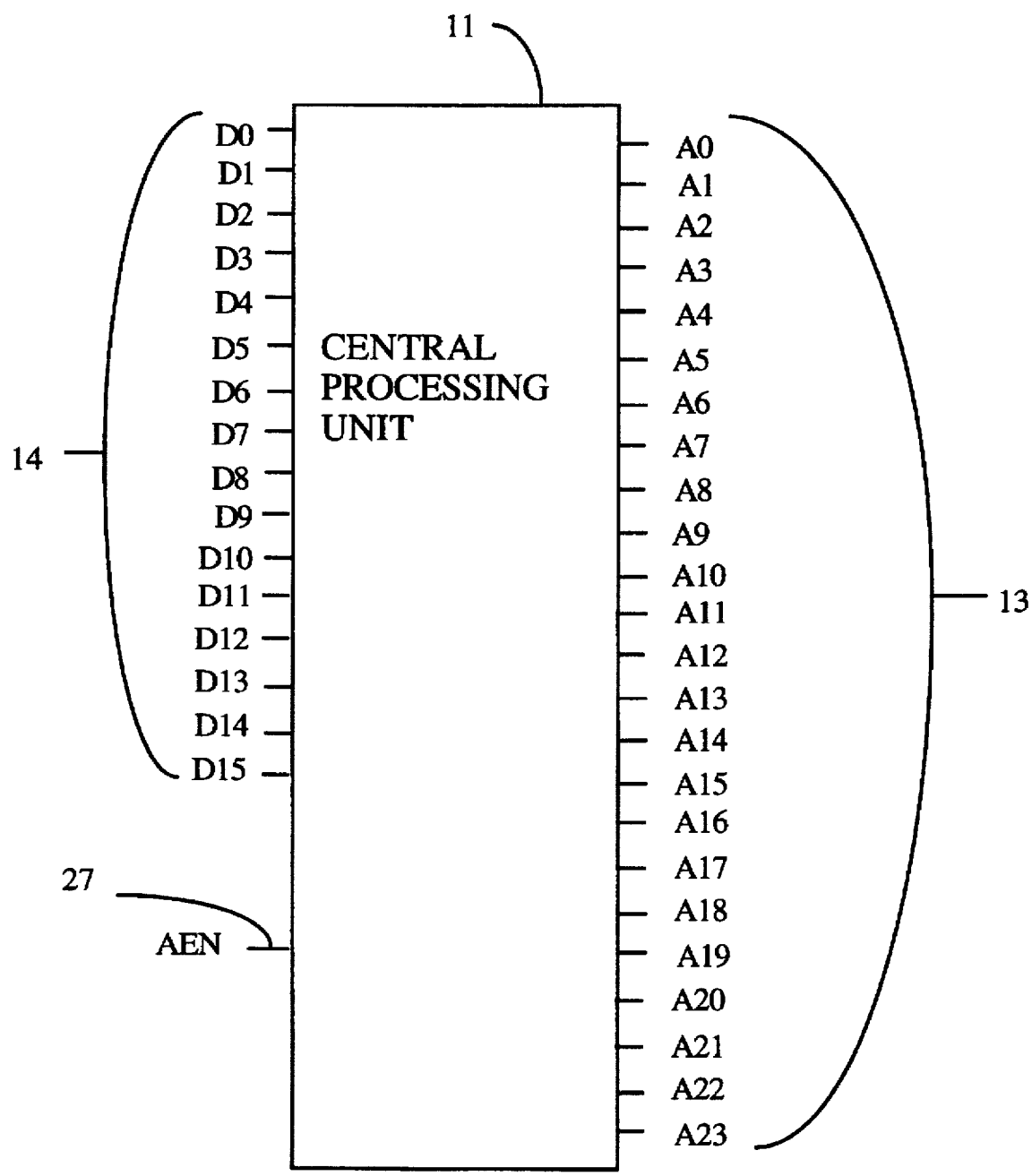
FIG. 2 is a block diagram that illustrates industry standard architecture (ISA) bus connections utilized with the preferred embodiment, of the present invention.

Referring again to the drawings, the preferred embodiment for resolving circuit board conflicts will be discussed. With reference to FIG. 2, certain bus connections for the central processing unit 11 are shown. It is known to and should be appreciated by those skilled in the art that additional bus connections (not shown) are available on an ISA bus. Referring now to FIGS. 1–2, the ISA address bus 13 is formed by individual address lines A0–A23, which represent the twenty-four address lines available on a computer system utilizing the ISA bus. Address bus 13 is used to address memory, including the memory units 18 or 19 and input/output devices connected to the computer system 10. Up to 16 megabytes (16 Mbytes) of memory may be addressed by the address bus 13, specifically the address lines A0–A23. Line A0 represents the least significant address bit while line A23 represents the most significant address bit.

The data bus 14, formed by individual data lines D0–D15, transfers data between the central processor 11, the memory units 18 and 19, and input/output devices. Data line D0 represents the least significant data bit and data line D15 represents the most significant data bit. The AEN line 27 is used to effectively remove or de-gate the central processing unit 11, or other devices from the input/output communication lines on the data bus 14, to permit direct memory access operations. During direct memory access operations, the DMA unit 16 directs information from an input/output location on one of the circuit boards, such as the circuit board 20a, or computer system "motherboard" board (not shown), to a memory location contained on another circuit board, such as the circuit board 20b, or on the mother board. Other control lines are used to control direct memory access operations. Accordingly, the AEN line 27 may be used to de-gate circuit boards from the input/output channel as desired.

Referring again to FIG. 1, add-in circuit boards typically access memory located in the memory range between 640 Kbyte and 1 Mbyte, sometimes referred to as the adapter region. Add-in circuit boards 20a–c must be integrated into the resources of the computer system 10 in order to provide the specialized functions of the circuit boards 20a–c. When multiple circuit boards 20a–c are utilized, the various circuit boards may initially be set-up to use the same resources of the computer system 10, thereby resulting in a computer resource conflict, as known to those skilled in the art. In this circumstance, the POST processes and initialization processes may not be successfully completed when the computer is initially powered-up, thereby causing the computer to "hang". This prevents the system from booting or establishing all the necessary procedures for the central processor unit 11 to run the desired software programs.

When the start-up program encounters an add-in circuit board 20b which demands the same resources as other components of the computer system, a check sum error occurs if there is a memory conflict. In the event of a memory conflict, the POST process may not be completed and the computer may fail to boot. When a memory conflict occurs, a user generally may not proceed to use the computer system 10 until after removing one of the conflicting circuit boards. In view of this failure, it is desirable to isolate individual circuit boards 20a–c during the start-up process in a manner which identifies a resource conflict, such as a memory conflict, and to enable the computer system 10 to boot-up despite the resource conflict.

For the preferred embodiment, the BIOS routines along with the central processing unit 11, examines each of the circuit boards 20a–c during start-up to determine whether or not a resource conflict occurs. The computer system 10, the BIOS routines, and latches 24a–c operate to isolate one or more of the circuit boards 20a–c if a conflict occurs and to permit identification of the circuit board that presents the resource conflict.

In the preferred embodiment, a BIOS routine selectively examines, one by one, the expansion slots 22a–c containing add-in circuit boards 20a–c and selectively isolates or disables the circuit boards 20a–c which conflict with the computer system 10 or other boards. In ISA computer systems it would be desirable to effectively disable access to memory by a conflicting circuit board. Disabling access to the random access memory unit 19 can be accomplished by disabling address line A19 of a selected expansion slot 22a. Accordingly, disabling the address line A19 effectively eliminates the memory conflict and serves to isolate the conflicting add-in circuit board 20a.

Figure 3:
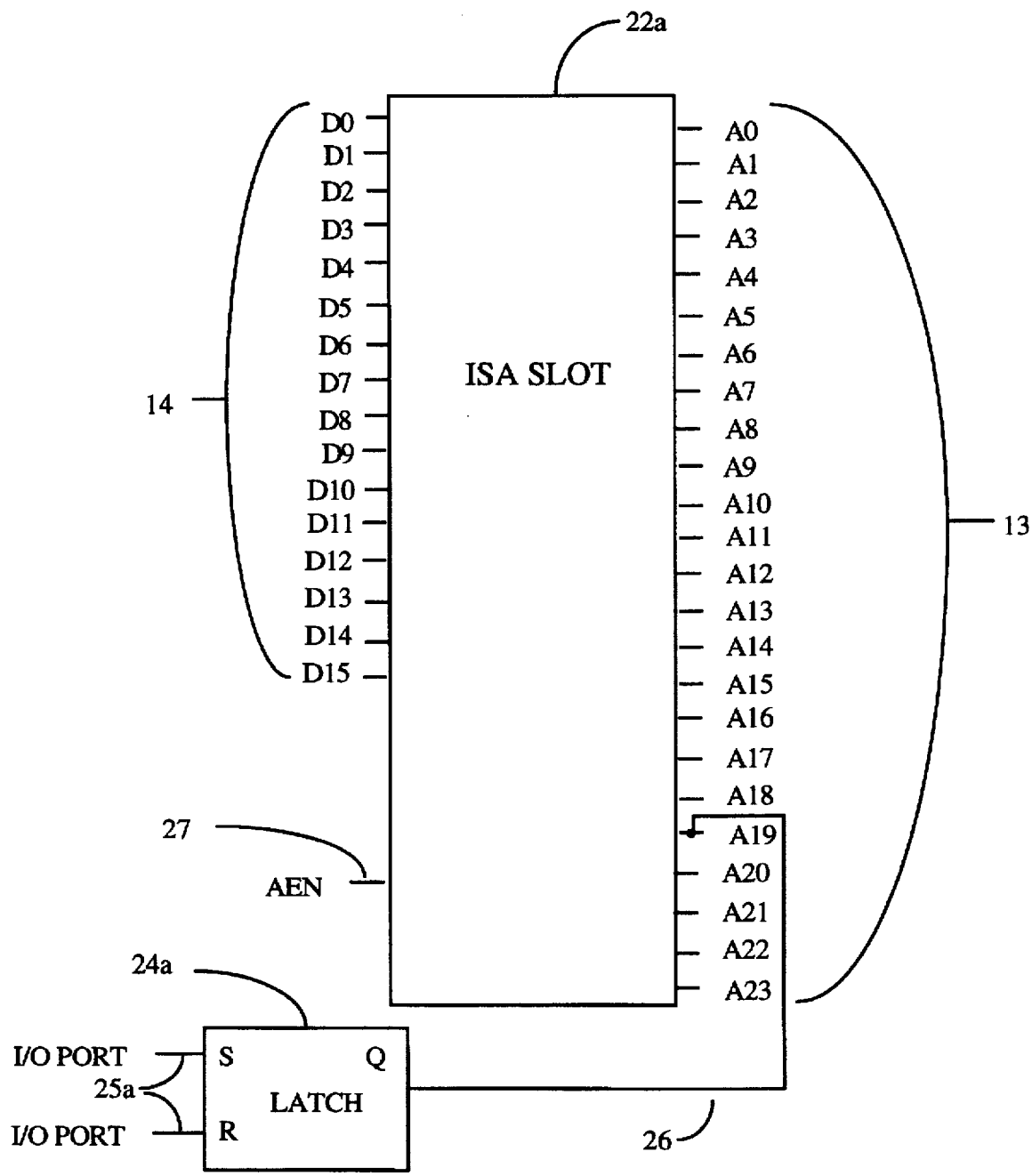
FIG. 3 is a block diagram showing an ISA expansion slot and a latch connected to an address line of the expansion slot.

FIG. 3 shows a block diagram of the ISA expansion slot 22a and the latch 24a, which is connected to an address line A19 of the expansion slot 22a by a line 26. It will be understood that a similar electrical circuit is formed by each of the combinations of the expansion slot 22b/latch 24b and the slot 22c/latch 24c. Referring to FIGS. 1 and 3, to completely isolate the ISA circuit board 20a, the AEN line 27 for the expansion slot 22a is enabled so as to isolate the circuit board 20a from the input/output lines of the computer system 10. Second, the address line A19, which corresponds to the memory locations generally designated or allocated for use by the circuit board 20a, is disabled to disconnect the circuit board 20a from the random access memory unit 19.

Toggling off the A19 line prevents the selected ISA circuit board 20a from accessing the random access memory unit 19 between 512 Kbytes–1 Mbyte so as to prevent memory conflicts with the other devices. Enabling the AEN line 27 associated with the circuit board 20a prevents the selected board from conflicting with input/output operations of other devices. It will be appreciated that enabling or addressing the AEN line associated with an expansion slot prevents a circuit board from communicating via the input and output ports of the computer system. Thus, the process of selecting the AEN line 27 associated with the circuit board 20a and disabling the A19 line effectively isolates the circuit board 20a from communicating with other devices of the computer system 10. In this manner, the computer 10 can boot without interference from the conflicting circuit board 20a.

In the preferred embodiment, the latch 24a operates to disable access to a certain portion of the random access memory unit 19 designated for use by the circuit board 20a. The output of latch 24a is coupled to the A19 line of expansion slot 22a and the input of the latch 24a is assigned to input/output port of the computer system. In the preferred embodiment, access to the certain portion of the random access memory unit 19 is controlled by the hardware latch 24a, in conjunction with a computer program, such as a BIOS routine, in addition to the BIOS routines normally provided for start-up. The BIOS routine operates to toggle a bit to control the state of the latch 24a. The latch 24a may be implemented with flip-flops, NAND gates, NOR gates, transistor switches or other devices which provide the set-reset function of a latch as known to those skilled in the art. Toggling the latch 24a selectively enables or disables the A19 line to control access to memory designated for use by the circuit boards 20a.

The set(S)-reset(R) latch 24a illustrated in FIG. 3 is connected to the A19 line of the expansion slot 22a. S and R represent inputs to the latch 24a and Q represents the output of the latch 24a. Generally, set means that Q=1 when S=1 and reset means that Q=0 when R=1. Input/output ports 25a–c shown in FIG. 1 of the computer system 10 are used to provide signals to the inputs of the latches 24a–c in the preferred embodiment. In order to access the input/output ports 25a–c, the central processor unit 11 provides a signal on the control bus 13. The signal indicates to all input/output devices that the information on the address bus 12 of FIG. 1 is that of a particular port, such as input/output port 25a controlling the latch 24a. A register in the central processor unit 11, which is used in conjunction with the address bus 13 and the data bus 14, provides a signal to latch 24a as needed to disable the slot 22a. The latch 24a responds accordingly to set or reset the A19 address line which is the address line of the expansion slot 22a associated with memory for use by circuit board 20a. Line A19 is enabled when the latch 24a is set and is disabled when A19 is reset.

Figure 4A:
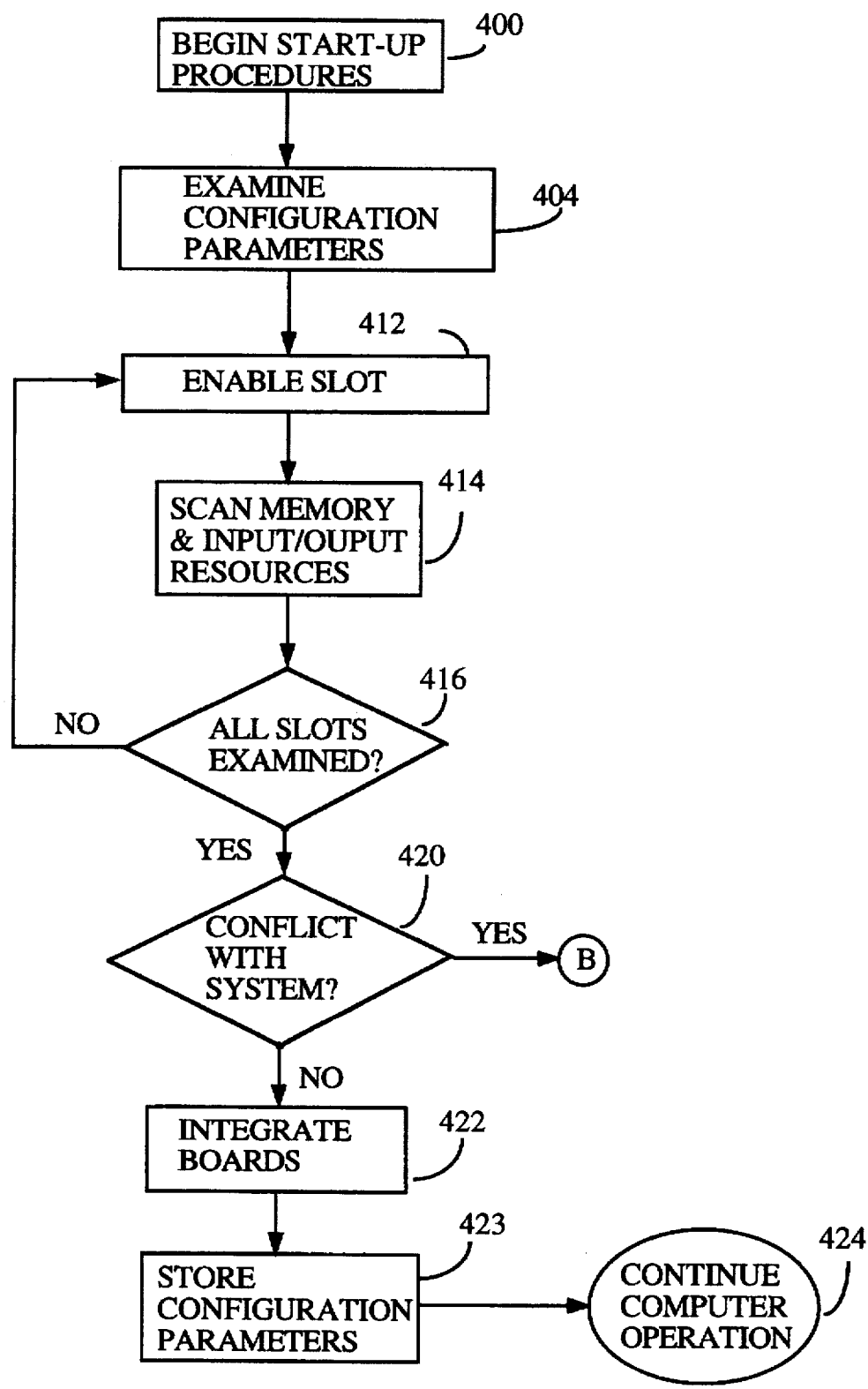
FIGS. 4a–4c are flow chart diagrams showing the preferred steps for a method for isolating a circuit board from a computer system.
Figure 4B:
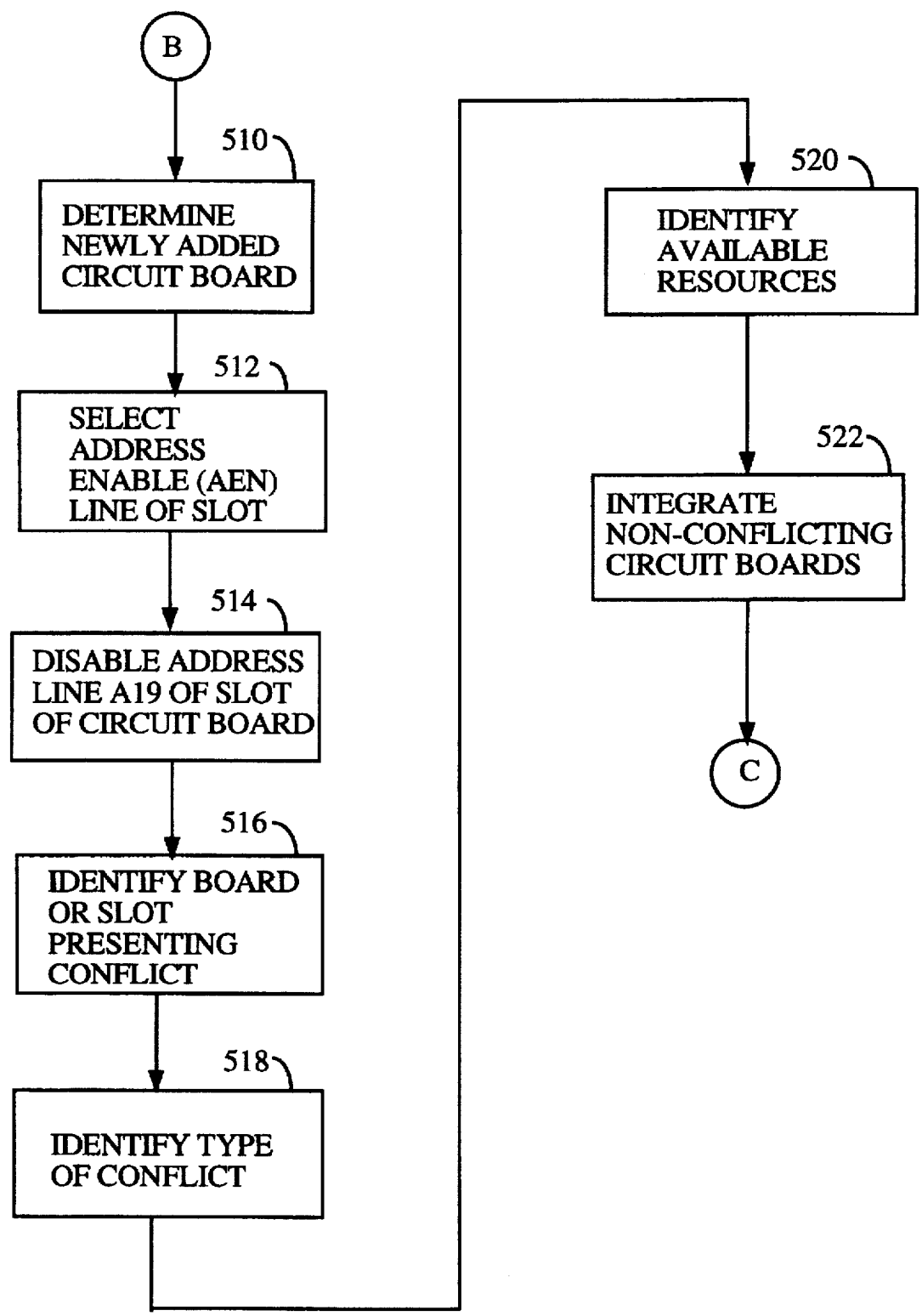
Figure 4C:
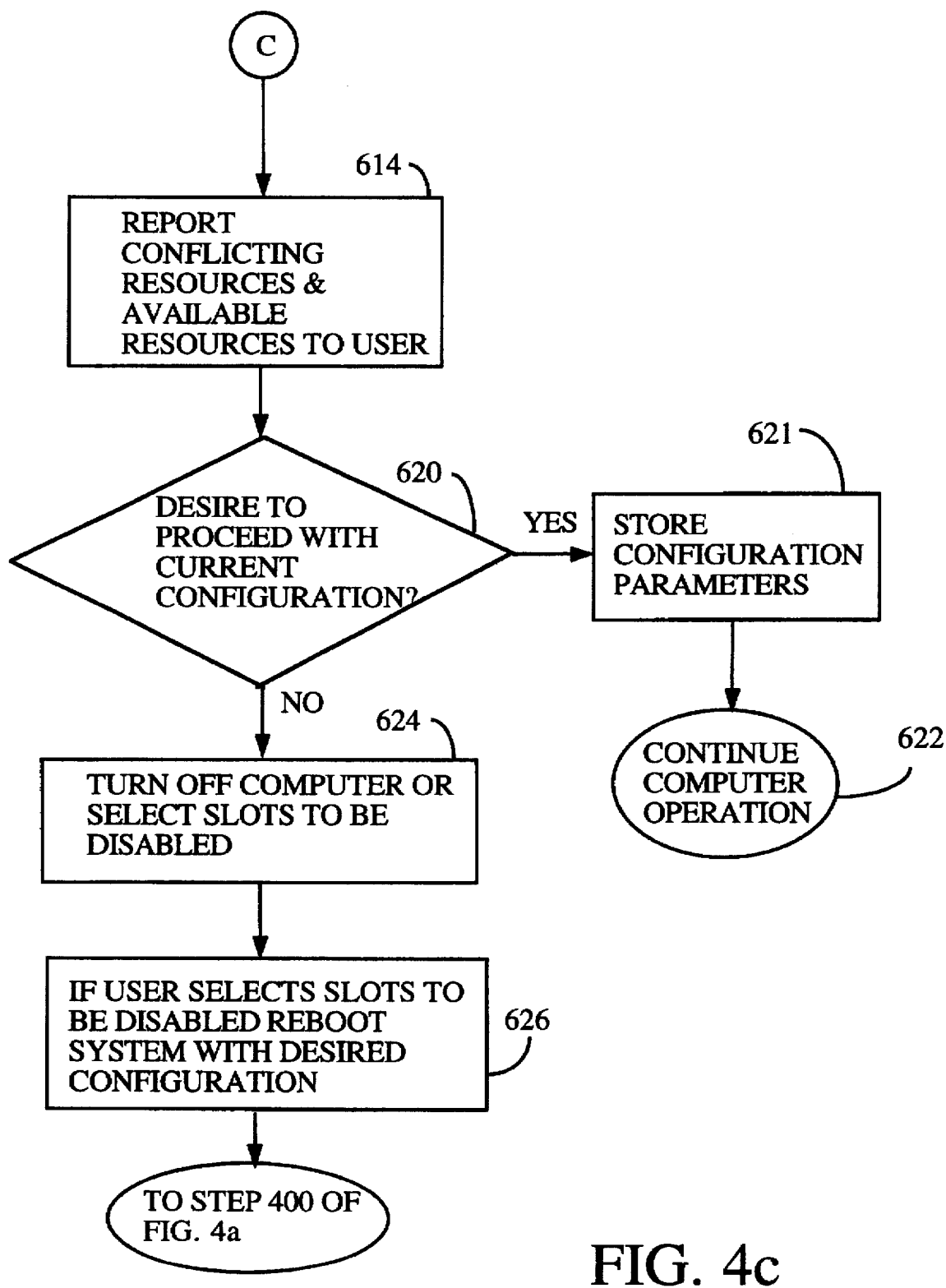

The preferred steps of the method for resolving resource conflicts in the computer are shown in FIGS. 4a, 4b, and 4c. As noted above, resource conflicts are determined by first identifying the devices and address space requirements of various computer system components, as known to those skilled in the art, and then analyzing the requirements to determine if a conflict in resources results. The steps of the preferred method are implemented with a computer program operating on a general purpose computer such as the computer system 10 in FIG. 1. It will be appreciated that conventional software development techniques are used for developing the computer program. The preferred steps will be discussed in conjunction with FIGS. 1 and 3.

FIG. 4a shows the process for examining expansion slots and the resource requirements of the circuit boards. Referring to FIGS. 1 and 4a, at step 400, the start-up procedures for the computer system 10 are initiated. It should be understood that all expansion slots 22a–c are disabled when the process begins. At step 404, a set of configuration parameters stored in CMOS random access memory is analyzed. The configuration parameters include a check list of the expansion slots 22a–c that were occupied by a circuit board and enabled during the previous boot sequence. If the computer system has not been previously configured with circuit boards then configuration parameters will indicate that no expansion slots 22a–c were occupied in the previous boot sequence. The configuration parameters also contain a user list or user parameters that specify whether the previous user indicated that preselected expansion slots 22a, 22b or 22c are to be disabled, as described herein, and are to remain disabled until changed by the user. At step 412, one of the expansion slots 22a, 22b, or 22c, which has not been disabled by the previous user, is enabled. At step 414, a BIOS routine examines or scans the enabled expansion slot to determine the circuit board's memory or input/output resource requirements, as noted above. At step 416, a determination is made as to whether all the slots 22a, 22b, or 22c have been examined. If all necessary slots have not been examined, the process proceeds to step 412 so that another slot may be examined. However, if all the necessary slots have been examined the process proceeds to step 420.

At step 420, if a conflict with the computer system was detected based on the resource scanning at step 414, then the "YES" branch is followed and the process proceeds to B of FIG. 4b. However, if a conflict was not detected during step 414, then at step 422 the appropriate circuit boards are integrated into the computer system 10 in a normal manner, as known to those skilled in the art. At step 423, the current list of attached devices is stored to the check list. At step 424, computer operation continues in a normal manner.

Referring to FIGS. 1 and 4b, at step 510, a determination is made as to which of the circuit boards has been added to the computer system 10 by comparing the current list of attached devices to the devices listed in the check list of the configuration parameters. The slot of the conflicting circuit board is effectively disabled during the steps 512 and 514. At step 512, the AEN line 27 is selected so as to effectively isolate the conflicting circuit board from communications with input/output lines of the computer system devices. At step 514, the address line associated with conflicting circuit board memory space, A19, is disabled. At step 516, the identification of the slot containing the conflicting board is found and stored for reference. At step 518, the identity of the conflicting resource, such as memory or input/output, is stored for reference. At step 520, a list of the available memory ranges or input/output resources is determined as known to those skilled in the art and is also stored for reference. At step 522, the non-conflicting circuit board or boards are integrated into the computer system 10. The process then proceeds to C of FIG. 4c.

Referring to FIGS. 1 and 4c, at step 614, the resources or circuit boards 20a, 20b, or 20c which conflict with the computer system 10 are displayed. Also, the computer system resources available for use without conflict are displayed at step 614. At step 620, the user may proceed with the current configuration or choose an alternative configuration. If, at step 620, the user decides to proceed with the current configuration, then at step 621, the current list of attached devices is stored to the check list. The computer system 10 then continues its normal operation at step 622. At step 620, if the user does not desire to proceed with the current configuration, then at step 624 the user may turn off the computer system 10 or the user may select to disable a slot containing a circuit board other than the newly added board or the circuit boards identified by the preferred process as conflicting.

If the user selects the option of disabling a circuit board (disabling the expansion slot corresponding to the circuit board) other than the newly added conflicting circuit board, then the expansion slot selection will be saved as a user parameter with the configuration parameters, and the expansion slot for that circuit board will remain disabled when the computer system is rebooted. The computer system 10 is then rebooted with the desired configuration at step 626 and the process returns to step 400 of FIG. 4a.

In connection with the configuration parameters, after the computer system operation continues, the user may invoke a utility program, by conventional methods, to change the user selected parameters to allow all or a different set of expansion slots to be examined upon the next boot sequence. The utility program may also permit a user to modify the check list as needed, for example, if the user plans to remove certain boards from the computer system.

It should be appreciated by those skilled in the art that known methods, other than discussed above, of identifying resources and conflicts may be utilized. Also, it should be appreciated that many methods of identifying newly added boards may be utilized such as evaluating a circuit board identification number, if available, or data strings in the circuit board to determine whether the board was utilized during the previous computer operation. As known to those skilled in the art, other modifications may be made to tailor the invention to other specifications.

As noted above, the present invention provides the benefit of effectively isolating circuit boards from the computer system. The preferred embodiment of the present invention provides the benefit of selectively isolating conflicting add-in circuit boards from computer system resources and enabling a computer system to boot or operate despite initial memory conflicts resulting from add-in circuit boards. In the preferred embodiment, a latch connected to an address line controls access to memory to allow the computer system to operate when memory conflicts result from add-in circuit boards.

The foregoing relates to the preferred embodiment of the present invention, and many changes may be made therein without departing from the scope of the invention as defined by the following claims.

I claim:

1. An apparatus for resolving resource conflicts within a computer system and having computer system resources interfaced via a computer system bus, said resource conflicts associated with the installation of a circuit board to said computer system, comprising:

a central processing unit connected to said computer system bus;

a memory unit connected to said computer system bus;

a slot connected to said computer system bus and coupling said circuit board to said computer system bus;

a latch connected to the address line of said slot that is operative for addressing the portion of said memory corresponding to default memory assignments for said circuit board, the output of said latch being connected to said address line of said slot and the inputs lines of said latch being connected to said computer system bus and said input lines operative to receive input signals from said central processing unit;

said central processing unit operative to generate an activating input signal, via said computer system bus, to said latch upon detection of a resource conflict; and said latch responsive to said activating input signal to provide an output signal to said address line to selectively disable access by said circuit board to said memory unit.

2. The apparatus of claim 1 wherein said latch is connected to address line A19 of said slot.

3. The apparatus of claim 2 further comprising a control line of said computer system bus connected to said slot for disabling communications via said input and output ports.

4. The apparatus of claim 3 wherein said control line is the address enable line.

5. A computer system characterized by resources including a central processing unit, a memory, input and output ports and expansion slots for receiving circuit boards, and an address bus, a data bus and a control bus connected to said resources, said circuit boards being initially configured to operate in a certain memory range, comprising:

means for beginning start-up procedures for said computer system, said start-up procedures beginning initialization of said circuit boards of said computer system; and means for continuing said start-up procedures, while said circuit boards remain in said expansion slots, when said certain memory range is assigned for use by another resource of said computer system, thereby causing a memory conflict, and when said computer system would normally be interrupted due to said memory conflict.

6. A general purpose computer system characterized by resources including a central processing unit, a memory, input and output ports and expansion slots for receiving circuit boards and an address bus, a data bus and a control bus connected to said resources for preventing resource conflicts within a computer system when a circuit board is added to said system, comprising:

a central processing unit for determining when a resource conflict occurs and for providing an output signal indicative of a resource conflict; and a latch, connected to a certain address line of said address bus of one of said expansion slots, for controlling access to a portion of said memory by said circuit board, said latch being responsive to said output signal for selectively disabling access to said portion of said memory via said certain address line.

7. The system of claim 6 wherein said address line is address line A19.

8. In a general purpose computer system characterized by resources including a central processing unit, a memory, expansion slots for receiving circuit boards, input and output ports and a computer system bus including an address bus, a data bus and a control bus connected to said resources, a computer-implemented method of preventing memory conflicts within said computer system when a certain one of said circuit boards is added to an expansion slot of said computer system, comprising the steps of:

beginning start-up procedures for said computer system;

determining whether a memory conflict exists within said computer system when said certain circuit board is added to said expansion slot;

in response to determining said memory conflict, activating an address enable (AEN) control line operative to control input and output operations of said certain circuit board with said computer system, thereby preventing said certain circuit board from communicating via said input and output ports of said computer system;

in response to determining a memory conflict, providing a control signal from said central processing unit to a latch, said latch being connected to said central processing unit and to an address line A19 of the expansion slot containing said certain circuit board, said address line A19 operative for addressing the portion of said memory corresponding to default memory assignments for said certain circuit board; and in response to said control signal, said latch disabling said address line A19 while said certain circuit board remains in said expansion slot.

9. A computer-readable medium on which is stored a program module for preventing conflicts within memory of a computer system when a certain circuit board is added to an expansion slot of said computer system, comprising instructions which, when executed by said computer system, perform the steps of:

determining whether a memory conflict exists within said computer system when said certain circuit board is added to said expansion slot;

in response to determining said memory conflict, activating an address enable (AEN) control line operative to control input and output operations of said certain circuit board with said computer system, thereby preventing said certain circuit board from communicating via said input and output ports of said computer system;

in response to determining a memory conflict, providing a control signal to a latch, said latch being connected to a central processing unit (CPU) and to an address line A19 of the expansion slot containing said certain circuit board, said address line A19 operative for addressing the portion of said memory corresponding to default memory assignments for said circuit board; and in response to said control signal, said latch operative to disable said address line A19 while said certain circuit board remains in said expansion slot.

* * * * *